United States Patent [19]
Chua

[11] Patent Number: 5,253,466
[45] Date of Patent: Oct. 19, 1993

[54] FRUIT HARVESTING DEVICE

[76] Inventor: Jose A. Chua, 3915 Fruitvale Ave., Oakland, Calif. 94602

[21] Appl. No.: 843,251

[22] Filed: Feb. 28, 1992

Related U.S. Application Data

[63] Continuation-in-part of Ser. No. 678,739, Apr. 1, 1991, Pat. No. 5,142,854.

[51] Int. Cl.$^5$ ..................... A01D 46/22; A01D 46/24
[52] U.S. Cl. ......................................... 56/335; 56/336
[58] Field of Search ............... 56/335, 336, 332, 328.1

[56] References Cited

U.S. PATENT DOCUMENTS

| | | | |
|---|---|---|---|
| 590,923 | 9/1897 | Wald et al. | 56/336 |
| 679,320 | 7/1901 | Kruse | 56/335 |
| 853,313 | 5/1907 | Myers | 56/336 |
| 938,355 | 10/1909 | Virgin | 56/335 |
| 1,138,789 | 5/1915 | Raney | 56/336 |
| 1,247,878 | 11/1917 | Raney | 56/336 |
| 2,346,986 | 4/1944 | Metzger | 56/335 |

FOREIGN PATENT DOCUMENTS 170166 7/1951 Austria .................... 56/333

Primary Examiner—Stephen J. Novosad
Attorney, Agent, or Firm—Bielen, Peterson & Lampe

[57] ABSTRACT

A device for harvesting fruit for biological entities such as a tree or bush utilizing a frame member. The frame member includes a first cutting edge portion and a second cutting edge portion which is linked to the frame member. The first and second cutting edge portions are positioned adjacent one another and form a converging channel which is capable of severing attachment of the fruit attached to the tree. Handle means is also included for permitting the user to grip the frame member and capture fruit in the channel portion formed by the first and second cutting edges.

10 Claims, 5 Drawing Sheets

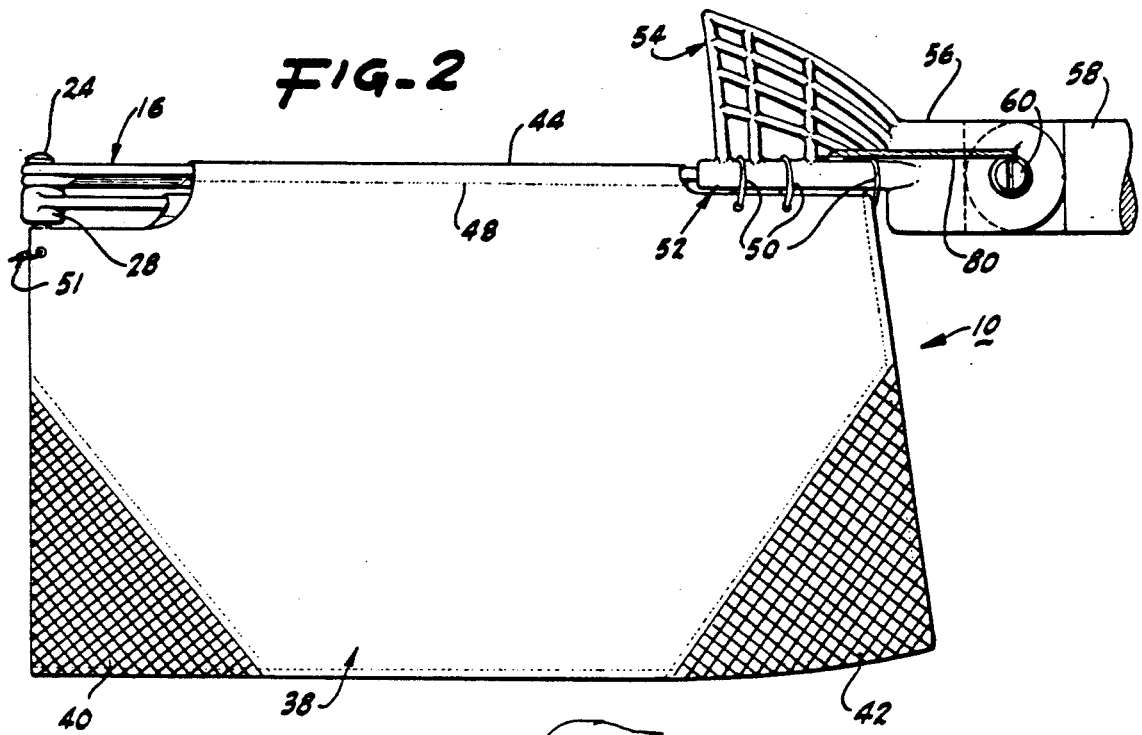
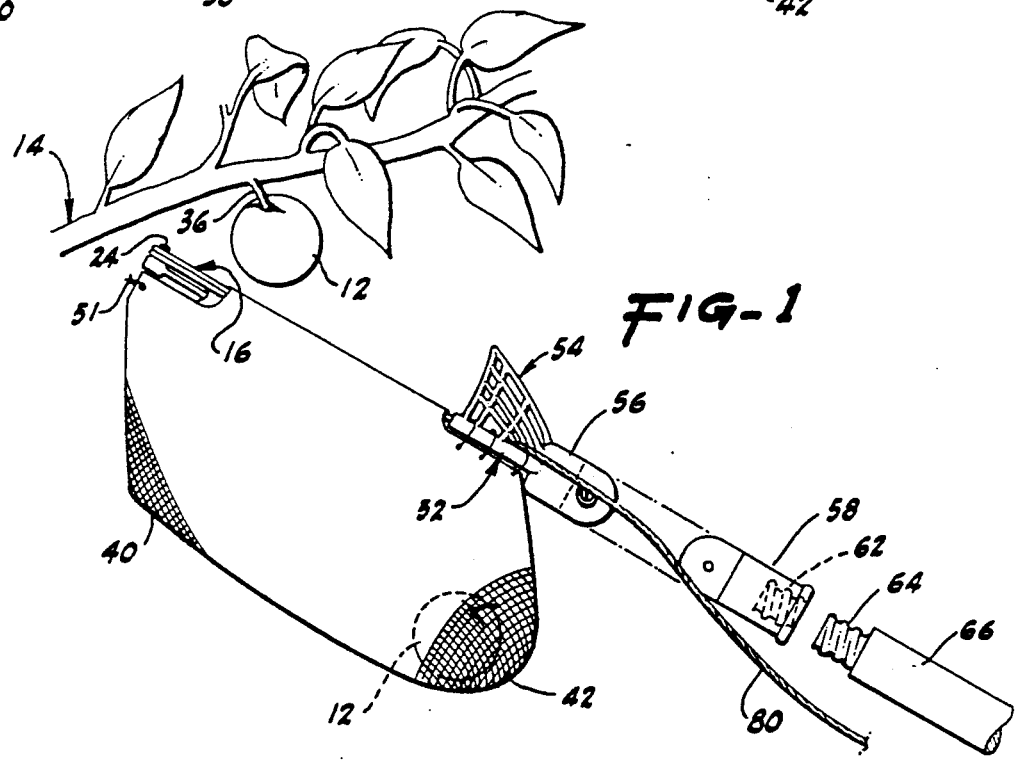

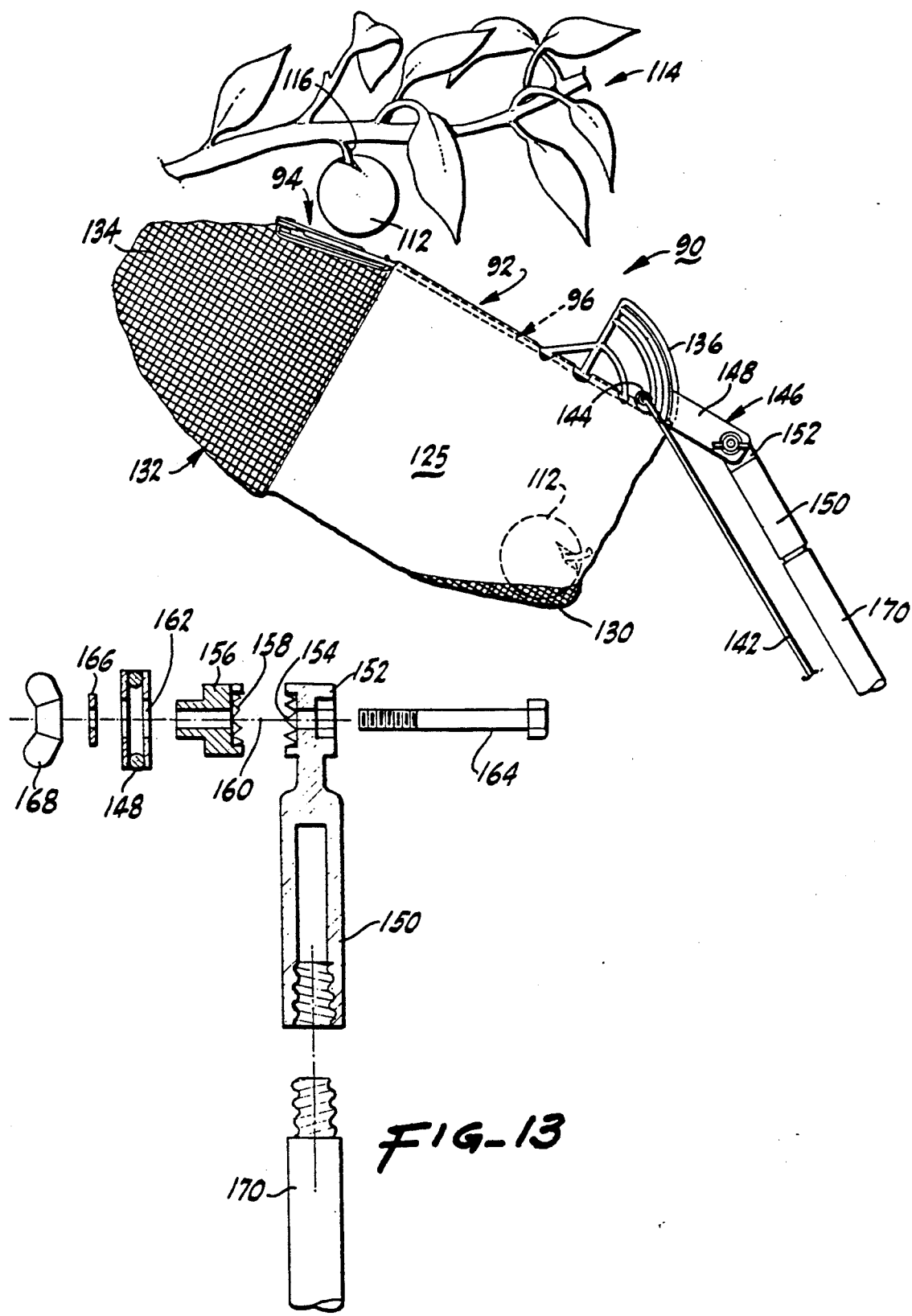

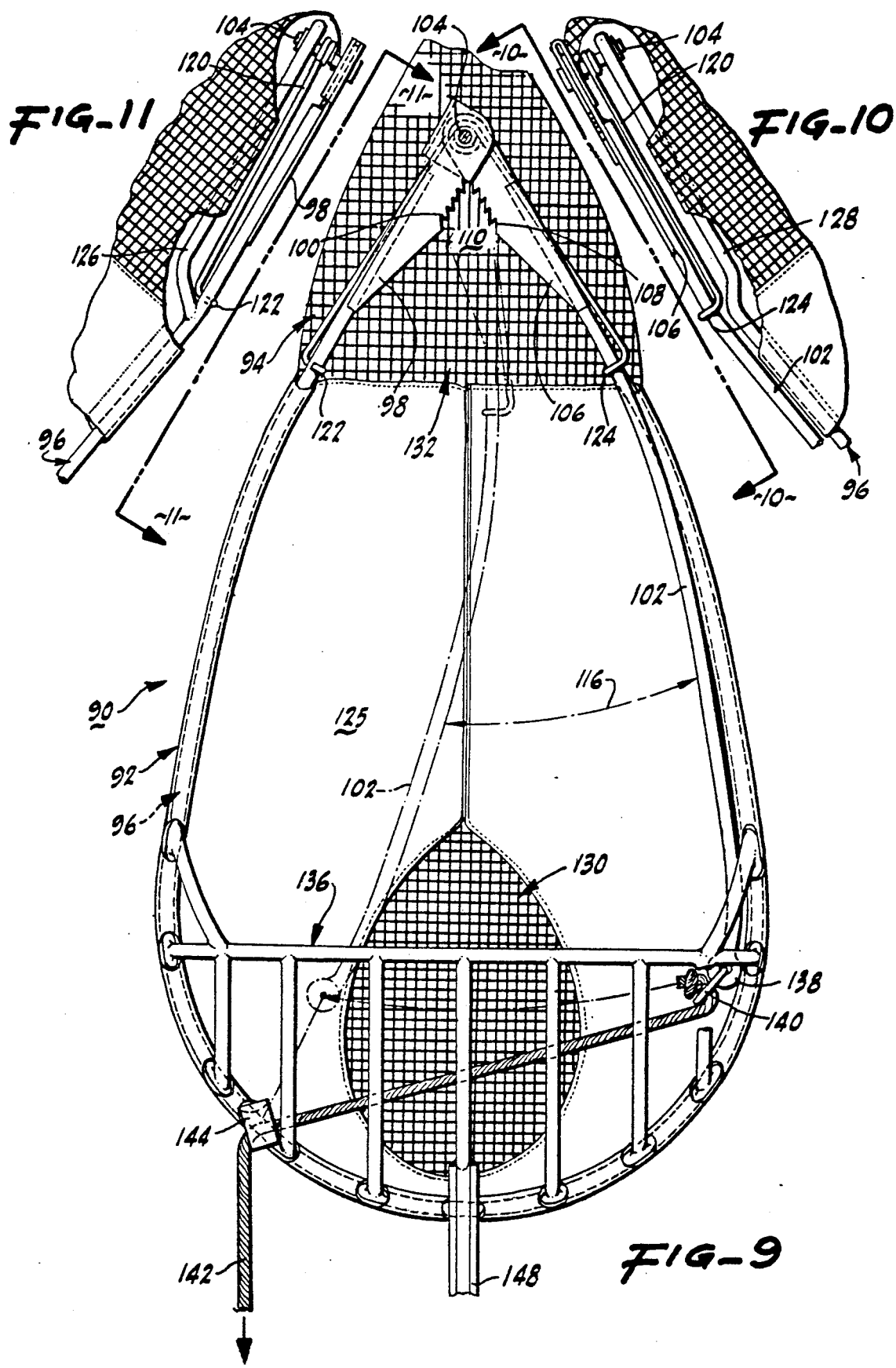

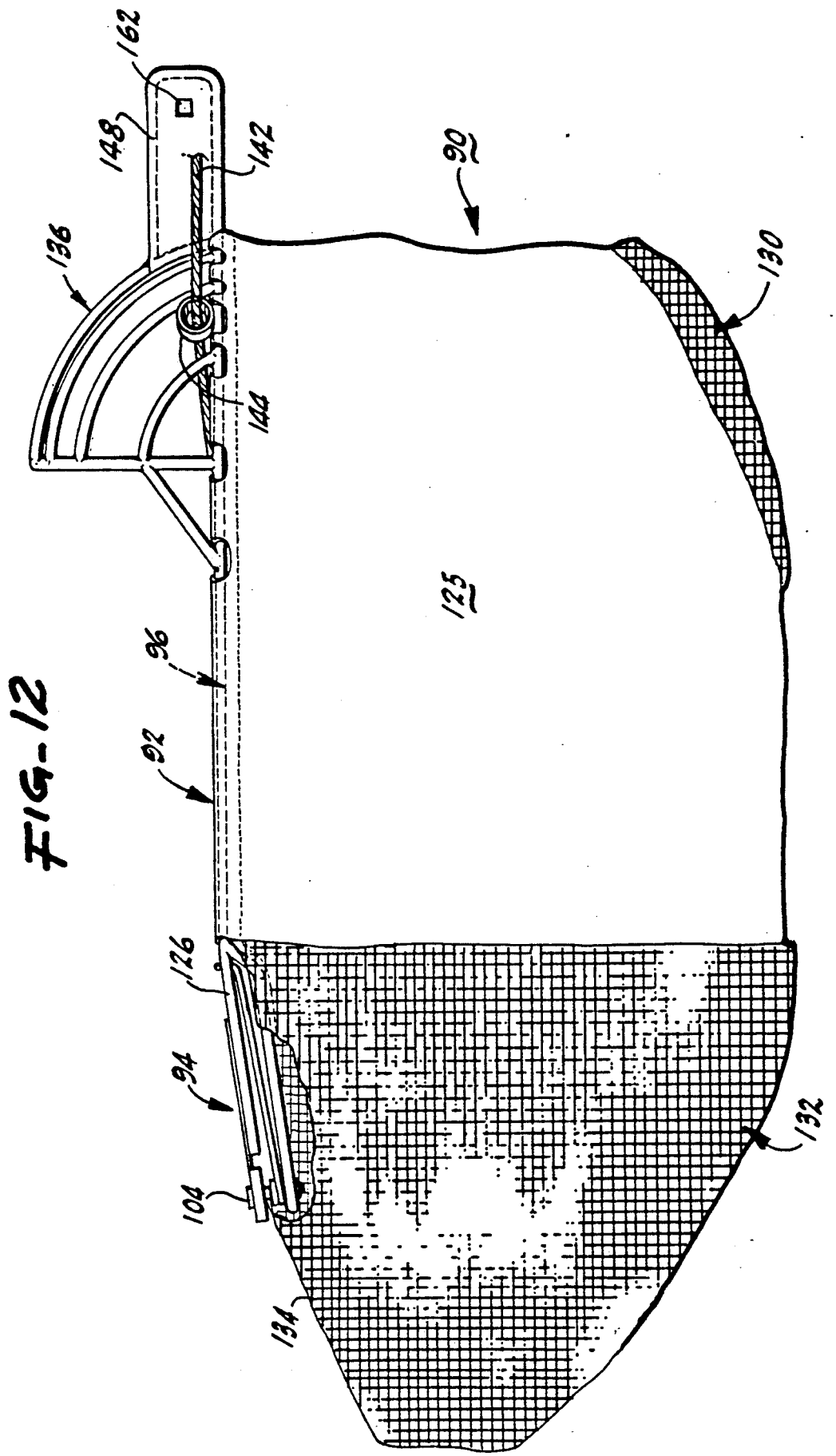

FRUIT HARVESTING DEVICE

CROSS-REFERENCES TO RELATED APPLICATION

The present application is a continuation-in-part of my copending application Ser. No. 07/678,739 filed Apr. 1, 1991, and now U.S. Pat. No. 5,192,854.

CROSS-REFERENCE

Disclosure document 255951 was filed on Jun. 21, 1990 in the United States Patent and Trademark Office.

BACKGROUND OF THE INVENTION

The present invention relates to a novel and useful device for harvesting fruit attached to a biological entity.

Fruits and vegetables usually grow on shrubs and trees and require harvesting or picking at the proper time to maximize commercial distribution and to minimize spoilage. Harvesting is an age old problem which normally requires intense manual work within a short period of time. Unlike harvesting of crops such as wheat, barley, corn, and the like, the harvesting of fruits and vegetables on bushes and trees has not been greatly mechanized.

To aid the manual harvesting of fruits, prior art devices have included wire baskets which tend to become entangled in the tree branches. Other devices have included cutting shears found at the heel of a basket which extends into a gripping pole. The manipulation of such a device is difficult to accomplish within the confines of a tree.

A harvesting device which overcomes the difficulties and problems found in the prior art would be a great advance in fruit processing industry.

SUMMARY OF THE INVENTION

In accordance with the present invention a novel and useful device for harvesting fruit attached to a biological entity is herein provided.

The device of the present invention utilizes a frame member which includes a first cutting edge portion. The frame member may be formed into a closed loop of elongated material such as metal tubing. Such loop may take the planar configuration of a teardrop such that the first cutting edge portion lies at the narrow position along such tear drop. A second cutting portion is linked to the frame member and positioned adjacent the first cutting edge portion to form a converging channel. Such channel formed by the first and second cutting edges is capable of severing attachment of the biological entity such as a tree. The first cutting portion may also include a recess along the cutting edge which further aids in the severing process. Further, each cutting edge may possess serrations for the same purpose.

The second cutting edge linked to frame member may include the provision of elongated member which is rotatably fastened to the frame member. Thus, the elongated member and the second cutting edge may be moved toward the first cutting edge in order to sever fruit from trees. Guide means may also be included for controlling the rotation of the rotating member. Such guide means may take the form of a rod and an encompassing member or ring connected to the elongated member which at least partially surrounds the rod. The rod may be connected to the frame member. Spring means may also be found in the present invention for urging the second cutting edge away from the first cutting edge. Such spring means may also be held by the rod and bear upon the rod encompassing portion of the elongated member. In addition, such spring means may wrap about a post and contact the first and second cutting edge portions urging the same together.

A line or a lead may be found in the present invention for connection to the elongated member. Means is also envisioned in the present invention for directing such line through the vicinity of a handle which is fastened to the frame member. Such handle permits the user to grip frame member. It should be noted that the handle means is positioned at the frame member opposite to the position of the channel formed by the first and second cutting edges such positioning may be at various angles between the handle and frame member. In this manner, the user severs fruit from a tree by pulling the frame member after engaging the stem portion of the fruit within the channel formed by the first and second cutting edges. A bag or basket is connected to the frame member to capture the fruit severed from the tree. Thus, the frame member forms a mouth of such a bag. A flange may extend from the frame opposite to the bag as a barrier against fruit escaping capture by the bag of the harvester of the present invention, since escaping fruit may be damaged or cause injury to persons.

In another embodiment of the present invention the frame member may be formed with first and second portions which are generally coplanar and angularly connected to one another. The first and second portion would contain a cutting edge to form the converging channel. In this manner, the frame handle may be manipulated in a generally vertical position. In addition, the bag may include a pouch or extension which extends transversely beyond the first cutting edge portion of the frame member. Moreover, this feature permits the fruit being harvested to extend into the pouch portion of the bag while the fruit is being severed from the tree or bush.

It may be apparent that a novel and useful device for harvesting fruit has been described.

It is therefore an object of the present invention to provide a device for harvesting fruits and vegetable of various sizes and shapes which permits the user to easily sever the fruit from the biological entity by a pulling motion.

It is another object of the present invention to provide a device for harvesting fruit attached to a biological entity which does not easily entangle within the branches of the shrub or tree holding the fruit.

Another object of the present invention is to provide a device for harvesting fruit from a biological entity which includes an easily manipulated scissor device which may be used to urge a pair of cutting edges toward one another.

Another object of the present invention is to provide a device for harvesting fruit which easily severs rigid stem fruit without damaging the tree.

Another object of the present invention is to provide a device for harvesting which permits selective picking of inaccessible and clustered fruit.

A further object of the present invention is to provide a device for harvesting fruit which includes an angulated frame member which permits the user to be positioned below and at a minimum horizontal distance from the fruit being harvested.

The invention possesses other objects and advantages especially as concerns particular characteristics and features thereof which will become apparent as the specification continues.

BRIEF DESCRIPTION OF THE DRAWINGS

FIG. 1 is a side elevational view of the device with an exploded handle portion depicted in the environment of use.

FIG. 2 is a side elevational view of the device of the present invention.

FIG. 8 is a side elevational view of another embodiment of the present invention in use.

FIG. 9 is a top plan view of the embodiment depicted in FIG. 8.

FIG. 10 is a view taken along line 10—10 of FIG. 9.

FIG. 11 is a view taken line 11—11 of FIG. 9.

FIG. 12 is a side elevational view of the embodiment of FIG. 8 in an enlarged format.

FIG. 13 is an exploded view depicting the components of the articulated and separable handle portions of the present invention.

For a better understanding of the invention reference is made to the following detailed description of the preferred embodiments thereof which should be taken in conjunction with the hereinabove described drawings.

BRIEF DESCRIPTION OF THE PREFERRED EMBODIMENTS

Various aspects of the present invention will evolve from the following detailed description of the preferred embodiments which should be compared with the heretofore described drawing.

Figure 5:
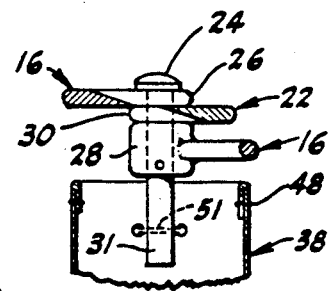
FIG. 5 is a sectional view taken along line 5—5 of FIG. 3.
Figure 7:
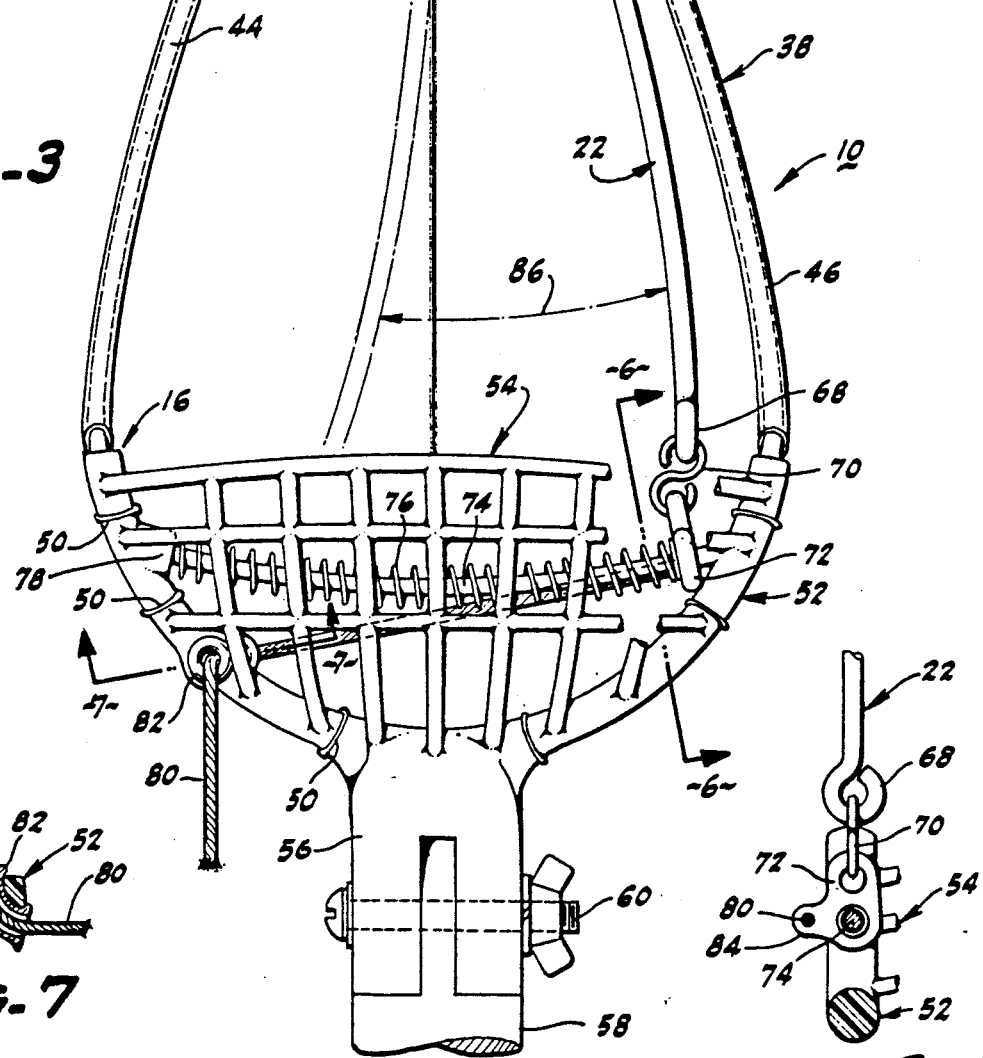
FIG. 7 is a sectional view taken along line 7—7 of FIG. 3.

The invention as a whole is depicted in the drawing by reference character 10. The harvesting device 10 is employed to harvest fruit such as apple 12 from a biological entity such as a apple tree 14, FIG. 1. Device 10 includes as one of its elements a frame member 16 which is shown in the drawings as being roughly teardrop shaped. Frame member 16 includes a first cutting edge portion which is integrally formed with a member 16. A second cutting edge portion 20 is found at the terminus 30 of elongated member 22. A pin 24, FIG. 5 holds the ring end 26 of frame member 16 and terminus 30 of elongated member 22. Bushing 28 of frame member 16 also surrounds the shank 31 of pin 24 and is positioned adjacent terminus 30.

Figure 4:
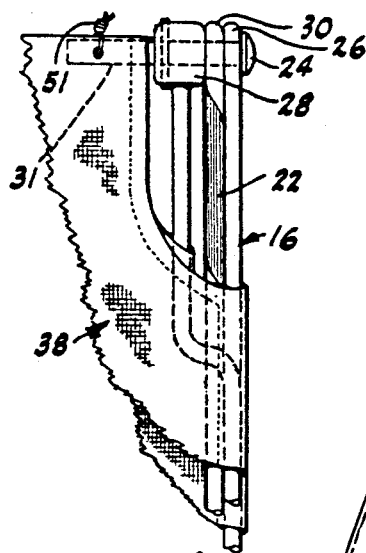
FIG. 4 is a side elevational view of the narrow channel portion of the frame member of the device of the present invention.
Figure 3:
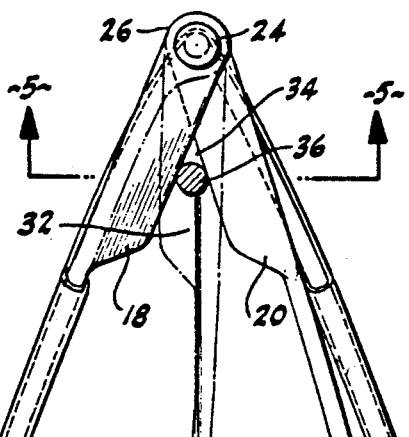
FIG. 3 is a top plan view of the device of the present invention the movable second cutting edge portion shown in two positions.

First and second cutting edge portions 18 and 20, respectively, form a channel 32 which converges to a narrow portion 34, FIG. 3. A stem 36 on a fruit, such as apple 12, is depicted in FIG. 3 within narrow portion 34 of channel 32. It should be noted that elongated member 22 is also depicted in FIG. 3 as being rotated such that second cutting edge portion 20 moves toward an under first edge cutting portion 18. Either pulling frame member 16 with elongated member rotated or not rotated will sever stem 36 and the fruit connected thereto. Such fruit is intended to fall within a bag or basket 38 having mesh portions 40 and 42, FIG. 2. Bag 38 includes a pair of sheath portions 44 and 46 which extend over elongated member 16. Sheath 44 and 46 may be sewn to frame member 16 along a sew line 48 shown in FIG. 2 in conjunction with sheath 44. Plurality of loops 50 hold bag 38 to heel portion 52 of frame member 16 FIGS. 2 and 3. Loop 51 partially encompassed shank 31 of pin 24, FIGS. 2 and 4.

Heel portion 52 of frame 16 is formed with a flange 54 of open configuration. Heel 52 includes a hollow butt 56 which accommodates a handle 58 which rotates or articulates relative to hollow butt 56. Thus, bolt fastener 60 may serve as a pivot for such articulation, FIGS. 1 and 3. Further, handle 58 may be constructed with an internal threaded portion 62 that engages an external threaded portion 64 of shaft 66. Shaft 66 extends from threaded portion 64 to a desired length depending on the type of harvesting for which device 10 is utilized.

Figure 6:
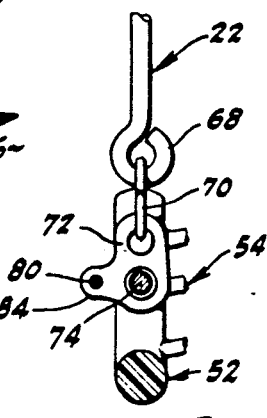
FIG. 6 is a sectional view taken along line 6—6 of FIG. 3.

Returning to FIG. 3, it may be observed that elongated member 22 includes a ring 68 and an S-hook 70 connected thereto. S-hook 70 also connects to a tab 72 that encompasses a curved rod 74 which spans heel portion 52 of frame member 16, FIGS. 3 and 6. Spring means 76 in the form of a coil spring, wraps around curved rod 74 and lies between tab 72 and boss 78 of heel portion 52 of frame member 16.

A line 80, of flexible material, extends through an eye 82 lies within heel portion 52 of frame member 16. Line 80 connects to pad eye 84 of tab 72. Thus, spring means 76 urges elongated member 22 and second cutting edge portion 20 away from first cutting edge portion 18.

FIG. 8 denotes another embodiment 90 of the device of the present invention. Fruit harvesting device 90 includes a frame member 92, FIGS. 8 and 9 having a first section 94 and a second section 96 which substantially lie in planes that intersect one another. In other words, frame member 92 is stepped or tiered. First section 94 possesses a first cutting edge portion 98 constructed with serrations 100. Rod 102 rotates about post 104 and also includes a cutting edge portion 106 having serrations 108. First and second cutting edge portions 98 and 106 form a converging channel 110 which is intended for severing the attachment of fruit, such as fruit 112, FIG. 8, from tree 114. Such severing may take place by simply pulling frame 92 away from fruit 112 with stem 116 position within converging channel 110. In addition, rod 102 may be rotated according to directional arrow 118, FIG. 9, to sever stem 116 with a scissor action. Spring means 120 wraps about post 104 and terminates in hooks 122 and 124 which attach to frame member 92 and movable rod 102.

Device 90 also includes a bag 124 which connects to second section 96 and to braces 126 and 128 which depend from second section 96 of frame member 92 and circumscribe post 104. Bag 124 may be fastened to frame member 92 by sewing depicted in the drawings, or by riveting, gluing, or other known fastening devices. Bag 124 includes a generally elliptical mesh portion 130 at the heel area of bag 124 to permit the escape of moisture from the interior of bag 124. In addition, bag 124 includes a front mesh portion 132 which extends outwardly and transversely from frame member 92 in the vicinity of converging channel 110. With reference to FIGS. 9 and 12, it may be observed that front mesh portion 132 forms a pocket 134 which permits the fruit 112 to freely extend therein during the severing process. Guard 136 is located on second section 96 of frame member 92 to guide the severed fruit into bag 124 after severing of the same from tree 114.

Rod 102 extends toward guard 136 terminating in an eye 138. Eye 138 includes a ring 140 which holds cord or line 142. Bushing 144 is mounted on second section 96 of frame 92 and serves to guide cord 142 to one side of device of 90. Handle 146 includes a tab 148 affixed to frame 92 and extending outwardly from heel portion of bag 124. Elongated element 150 includes a flattened portion having a jagged surface 154. Element 156 also includes a jagged surface 158 which meshes with jagged surface 154 of elongated element 150 in various positions of rotation about axis 160. A portion of element 156 extends through opening 162 of tab 148, FIG. 13. Bolt 164 passes through elongated element 150, element 156, and opening 162 of tab 148. Washer 166 and wing nut 168 fasten elongated element 150 to tab 148 in articulated fashion. With reference to FIG. 8, it may be seen that element 150 lies at an angle to tab 148, in this regard. Pole 170 threads into a elongated 150 to extend elongated element 150 as desired. In other words, pole 170 may be of sufficient length to reach fruit 112 in tree 114 with the user below.

In operation, the user maneuvers frame member 16 such that the narrow channel 32 engages the stem 36 of a fruit such as apple 12. At this juncture, the body of the fruit lies within the top portion of the bag 38. The user of device 10 then pulls frame member 16 by use of handle 58 such that first and second cutting edge portions 18 and 20 sever stem 36, dropping fruit 12 into bag 38. If such cutting is not possible through this action, the user then pulls line 80 which in turn rotates tab 72 against the expanding action of spring means 76 along curved rod 74. S-hook connected to ring 68 of elongated member 22 follows the arcuate path shown by directional arrow 86. Elongated member is thus pulled along the arcuate path shown by directional arrow 86, FIG. 3, which in turn moves cutting edge 20 closer to cutting edge 18 to sever stem 36. It should be noted that line 80 passes through pad eye 82 of heel portion 52 of frame member 16 when pulled or released. Releasing line 80 will permit spring means 76 to push elongated member 22 back to the position shown in solid line on FIG. 3 through the linkage afforded via tab 72 and S-hook 70. The embodiment 90, FIGS. 8 through 13. A similar method is implored to sever fruit 112 from tree 114. Stem 116 of fruit 112 is placed in channel 110 formed by first cutting edge portion 98 and second cutting edge portion 106 of frame member 92 and rod 102, respectively. The user may simply pull handle 170 away from fruit 112 to sever fruit 112 from tree 114 or use the scissor action provided by pulling of cord 142 then, thus, rod 102 which travels along arcuate path as indicated by directional arrow 118, FIG. 9. Fruit 112 extends into pocket portion 134 of bag 124 during this operation. Moisture and small particulate matter may pass through mesh portions 130 and 132 during the harvesting process. Handle 146 is articulated to provide the proper angle of first section of frame member 92 relative to stem 116 or fruit 112.

While in foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A fruit harvesting device comprising:
   a. a frame member including a first cutting edge portion;
   b. a second cutting edge portion linked to said frame member and positioned adjacent said first cutting edge portion, said first and second cutting edge portions forming a converging channel for severing attachment of the fruit to the biological entity; and
   c. handle means connected to said frame member for permitting the user to grip said frame member, said converging channel positioned at said frame member opposite to said connection of said handle to said frame member; and
   d. a bag connected to said frame member, said bag including a portion extending outwardly transversely from said frame member in the immediate vicinity of said converging channel, and at a position on said frame member opposite to said connection of said handle to said frame member.

2. The device of claim 1 in which said bag portion includes a mesh wall.

3. The device of claim 1 in which said frame member includes a first section generally lying in a first plane, and a second section generally lying in a second plane angularly disposed relative to said first plane.

4. The device of claim 3 in which said first section of said frame includes said converging channel.

5. The device of claim 4 which additionally includes an articulated handle connected to said frame member.

6. The device of claim 1 in which said first and second cutting edge portions include serrations.

7. The device of claim 1 which additionally comprises spring means urging separation of said first and second cutting edges.

8. The device of claim 7 in which said frame includes a post extending through said first and second cutting edge portions and said spring means encompasses said post and contacts said first and second cutting edge portions.

9. The device of claim 5 in which said articulated handle includes removable portions.

10. The device of claim 8 which further comprises a guard extending from said frame apart from said converging channel.

* * * * *